United States Patent
Yamada (10) Patent No.: US 6,837,430 B2
(45) Date of Patent: Jan. 4, 2005

(54) CONTENT REPRODUCTION APPARATUS

(75) Inventor: Tomohiro Yamada, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/343,328

(22) PCT Filed: May 30, 2002

(86) PCT No.: PCT/JP02/05322

§ 371 (c)(1),
(2), (4) Date: Feb. 6, 2003

(87) PCT Pub. No.: WO02/099654

PCT Pub. Date: Dec. 12, 2002

(65) Prior Publication Data

US 2004/0011869 A1 Jan. 22, 2004

(30) Foreign Application Priority Data

Jun. 4, 2001 (JP) .................................... 2001-167579

(51) Int. Cl.$^7$ .............................................. G06K 7/00
(52) U.S. Cl. ..................................................... 235/435
(58) Field of Search ........................... 235/435; 705/51, 705/52, 59

(56) References Cited

U.S. PATENT DOCUMENTS 4,740,890 A * 4/1988 William ..................... 713/200
5,014,234 A * 5/1991 Edwards, Jr. ............... 713/200

FOREIGN PATENT DOCUMENTS

| JP | 60-176157 | 9/1985 |
| JP | 3-290733 | 12/1991 |
| JP | 5-173895 | 7/1993 |
| JP | 2000-57057 | 2/2000 |
| JP | 2000-242565 | 9/2000 |
| JP | 2001-117824 | 4/2001 |
| JP | 2001-147803 | 5/2001 |

* cited by examiner

Primary Examiner—Thien M. Le
Assistant Examiner—April Taylor
(74) Attorney, Agent, or Firm—Westerman, Hattori, Daniels & Adrian, LLP (57) ABSTRACT

A content reproduction apparatus includes a CPU 18, and the CPU measures a power-on time period Ton, which is from a point of time that a main power switch 42 is turned-on until a point of time that it is turned-off, and a power-off time period Toff, which is from a point of time that the main power switch 42 is turned-off until a point of time that it is turned-on once again. Furthermore, a total sum T of the measured time periods Ton and Toff is evaluated, and the audio data is rendered invalid (not reproducible) when the evaluated total sum T exceeds a term of validity Ta of the audio data recorded in a memory card 12.

3 Claims, 6 Drawing Sheets

CONTENT REPRODUCTION APPARATUS

TECHNICAL FIELD

The present invention relates to a content reproduction apparatus for reproducing a content such as music, an image and so on. More specifically, the present invention relates to a content reproduction apparatus for reproducing a content having a term of validity.

PRIOR ART

In such a kind of a conventional content reproduction apparatus, a term of validity of a content is managed by taking advantage of a calendar function that the apparatus itself owns. That is, a date of the calendar of the apparatus itself and the term of validity of the content are verified, thereby invalidating (rendering not producible) the content when the date of the calendar of the apparatus itself elapses the term of validity of the content.

However, the date of the calendar of the apparatus itself can be set to an arbitrary date so that the content becomes reproducible if the date of the calendar of the apparatus itself is changed to a date within a relevant term of validity. Therefore, this gave rise to a problem that it is not possible to securely prevent an illegitimate use of the content having an elapsed term of validity in the above-described prior art, in which the term of validity of the content is managed by taking advantage of the date of the calendar that can be arbitrarily set.

SUMMARY OF THE INVENTION

Therefore, it is a primary object of the present invention to provide a novel content reproduction apparatus.

It is another object of the present invention to provide a content reproduction apparatus capable of securely preventing an illegitimate use of a content having an elapsed term of validity.

A content reproduction apparatus according to the present invention is a content reproduction apparatus for reproducing a content having a term of validity, and characterized in that the apparatus comprises: a first measuring means for measuring a first time period, which is from an on-operation of a main power until an off-operation thereof; a second measuring means for measuring a second time period, which is from the off-operation until the on-operation of a next time; a total sum calculation means for calculating a total sum of the first time period and the second time period; and an invalidating means for rendering invalid a reproduction of the content when the calculated total sum exceeds the term of validity.

In the present invention, the first measuring means measures the first time period, which is from the on-operation of the main power until the off-operation thereof, the second measuring means measures the second time period, which is from the off-operation of the main power until the on-operation thereof. Furthermore, the total sum calculation means calculates the total sum of the first time period and the second time period, and the invalidating means renders invalid the content when the calculated total sum exceeds the term of validity.

In another embodiment of the present invention, the content reproduction apparatus further comprises a back-up power, and the second measuring means includes a counting means that is driven by the back-up power and counts a time period, and a calculating means for calculating the second time period on the basis of a count value by the counting means when the off-operation is performed and a count value by the counting means when the off-operation of a next time is performed.

Furthermore, in still another embodiment of the present invention, the second measuring means includes a capacitor in which electric charges are accumulated, a discharging means that causes the electric charge accumulated in the capacitor to be discharged in response to the off-operation, a detecting means that detects a terminal voltage of the capacitor in response to the on-operation, and a calculating means that calculates the second time period on the basis of the detected terminal voltage.

According to the present invention, a time period, which is from the on-operation of the power until the off-operation thereof, and a time period, which is from the off-operation until the on-operation of a next time, are measured in a sequential manner, thereby managing the term of validity of the content on the basis of accumulated values of each of the measured time periods. Therefore, different from the above-described prior art in which the term of validity of the content is managed on the basis of the date of the calendar that is arbitrarily settable, the present invention is effective in surely preventing an illegitimate use of the content with an elapsed term of validity.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
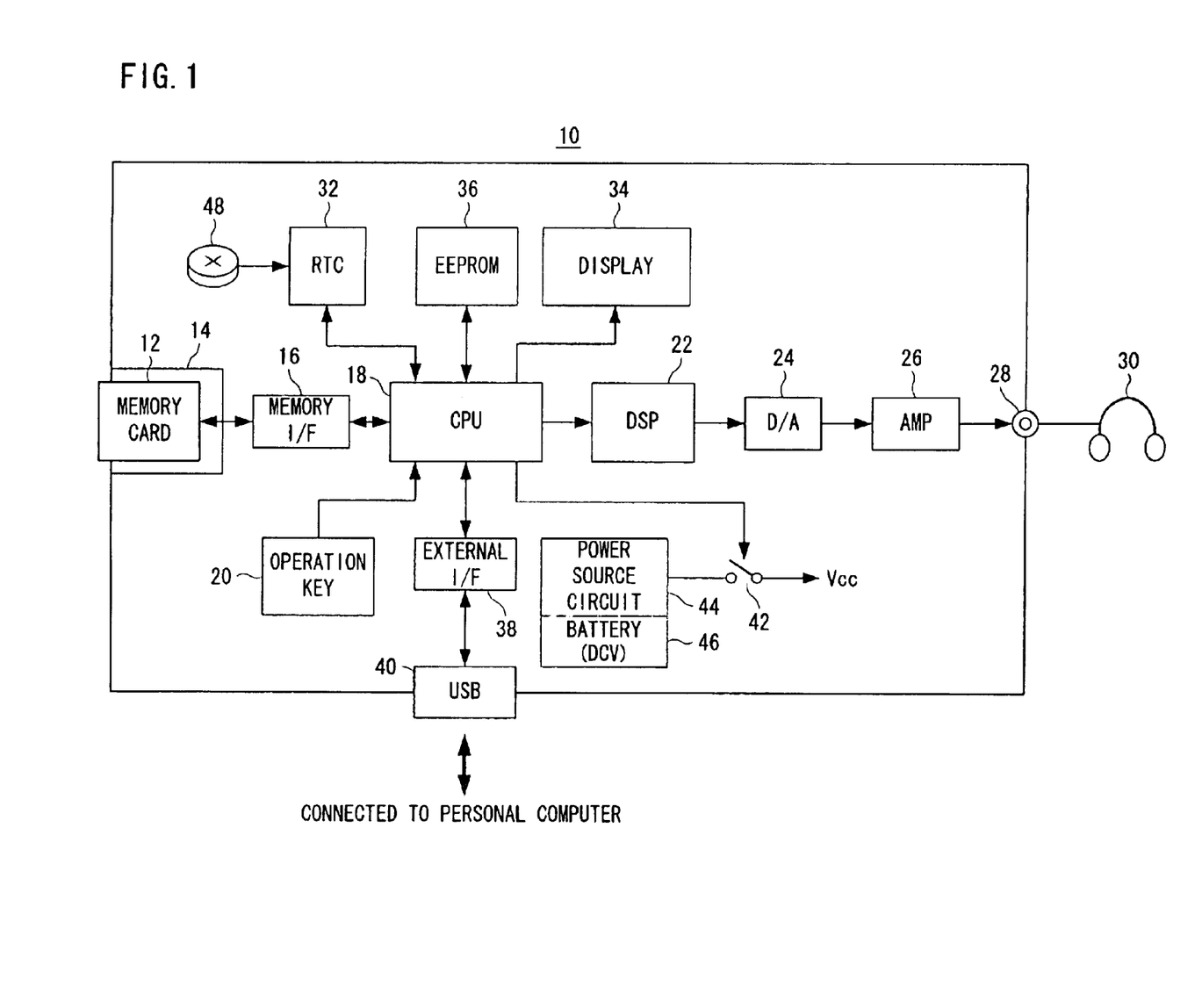
FIG. 1 is a block diagram showing schematic structure of a first embodiment of the present invention.

A content reproduction apparatus 10 in this embodiment shown in FIG. 1 is a portable type, for example, and an apparatus for reproducing audio data such as voices or sounds, a music, or the like as a content recorded in a memory card 12. The memory card 12 is an attachable/detachable recording medium, and electrically connected to a CPU (Central Processing Unit) 18 via a memory interface 16 when attached to a slot 14. It is noted that the audio data is recorded in the memory card 12 in a compressed state according to a predetermined compressing format such as an MP3 (MPEG-1 AUDIO Layer 3), an AAC (MPEG-2 Advanced Audio Coding), or the like. Furthermore, a decoding software (decoding or decrypting program) for expanding the compressed audio data is also recorded in the memory card 12.

The CPU 18 fetches the audio data and the decoding software from the memory card 12, and supplies the fetched audio data and the decoding software to a DSP (Digital Signal Processor) 22 when an instruction of starting the reproduction is applied from an operation key 20, to be more specific, when a reproduction key (not shown) that constitutes the operation key 20 is depressed.

The DSP 22 expands (decodes or decrypts) the audio data using the decoding software supplied from the CPU 18, and inputs the expanded audio data into a D/A converter 24. The D/A converter 24 converts the input audio data into an analog audio signal. Then, the converted audio signal is input into a headphone 30 via an output terminal 28 after being amplified by an audio amplifier 26, and this reproduces the voices or sounds (or music). It is noted that a suspension key (not shown) that constitutes the operation key 20 may be depressed in order to suspend a reproduction operation. Then, an instruction of suspending the reproduction is applied from the operation key 20 to the CPU 18, and as a result, the CPU 18 controls the DSP 22 so as to suspend the reproduction operation.

It is noted that an RTC (Real Time Clock) circuit 32 for counting a present time is connected to the CPU 18, and the CPU 18 realizes a calendar function on the basis of present time data supplied from the RTC circuit 32. Furthermore, a liquid crystal display 34 is connected to the CPU 18, and various kinds of information are displayed in response to operations of the CPU 18 on the display 34. Furthermore, an EEPROM (Electrically Erasable Programmable ROM) 36 is connected to the CPU 18, and a USB (Universal Serial Bus) terminal 40 is also connected thereto via an external interface 38.

Each of the circuits such as the CPU 18 is driven by power voltage Vcc supplied from a power source circuit 44 when a main power switch 42 is turned-on. Furthermore, the power source circuit 44 generates the power voltage Vcc on the basis of direct current voltage DCV supplied from a battery 46. However, the RTC circuit 32 needs to be driven even during a time period that the power switch 42 is turned-off so that a back-up battery 48 is used as a power source therefor. It is noted that the off-operation of the main power switch 42 is controlled by the CPU 18. That is, the CPU 18 turns-off the main power switch 42 when an instruction of turning-off the power is applied from the operation key 20, more specifically, when a power-off switch constituting included in the operation key 20 is depressed.

On the other hand, the audio data is downloadable from an Internet. That is, the Internet is accessed by a personal computer (not shown) so as to temporarily download desired audio data into the personal computer. Then, the personal computer (USB terminal of the personal computer, to be exact) is connected to the USB terminal 40 after the downloading so as to transfer the audio data downloaded into the personal computer to the CPU 18 via the USB terminal 40 and the external interface 38. This allows the CPU 18 to record the transferred audio data into the memory card 12 via a memory interface 16. In addition thereto, it is possible to fetch the audio data from a CD (Compact Disk), a DAT (Digital Audio Tape), and the like.

Figure 2:
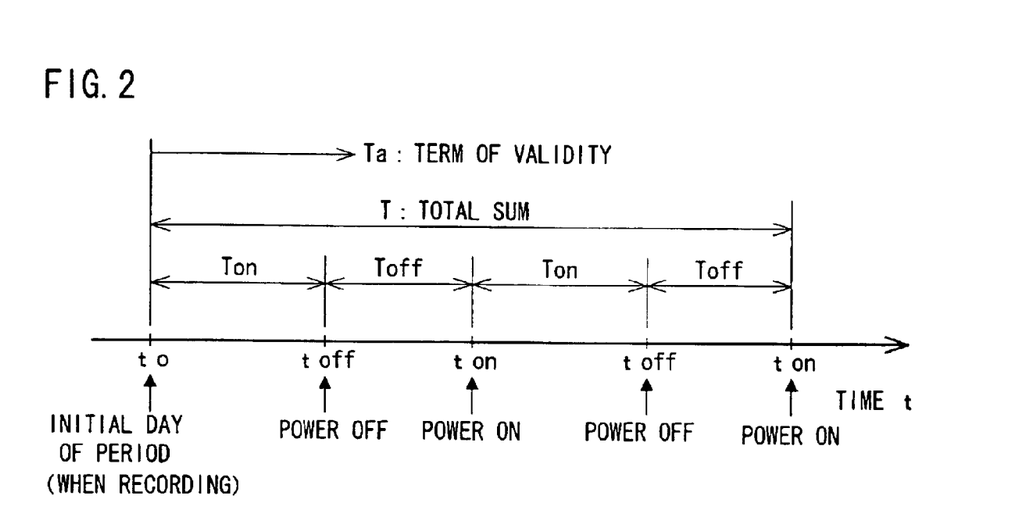
FIG. 2 is an illustrative view showing a method of managing a term of validity of a content in the FIG. 1 embodiment.

Incidentally, the content reproduction apparatus 10 of this embodiment is provided with a function that renders the data having elapsed term of validity Ta invalid (not reproducible) when reproducing the data having the term of validity Ta such as audio data for a trial listening. In realizing this function, in the content reproduction apparatus 10 of this embodiment, a so-called power-on time period Ton, which is from a point of time ton that the main power switch 42 is turned-on until a point of time toff, which is turned-off, and a so-called power-off time period Toff, which is from a point of time toff that the main power switch 42 is turned-off until a point of time ton, which is turned-on once again, are sequentially measured as shown in FIG. 2. Furthermore, an initial day of the term of validity of the audio data, that is, a day to when the relevant audio data is recorded into the memory card 12 is used as a reference, for example, thereby calculating a total sum (accumulating value) T of the power-on time period Ton and the power-off time period Toff from the reference day to. Then, the calculated total sum T and the term of validity Ta of the audio data are compared with each other, and then the audio data is rendered invalid when the total sum T exceeds the term of validity Ta. It is noted that the data with respect to the reference day to is stored in the above-described EEPROM 36 in a state associated with the audio data.

Figure 3:
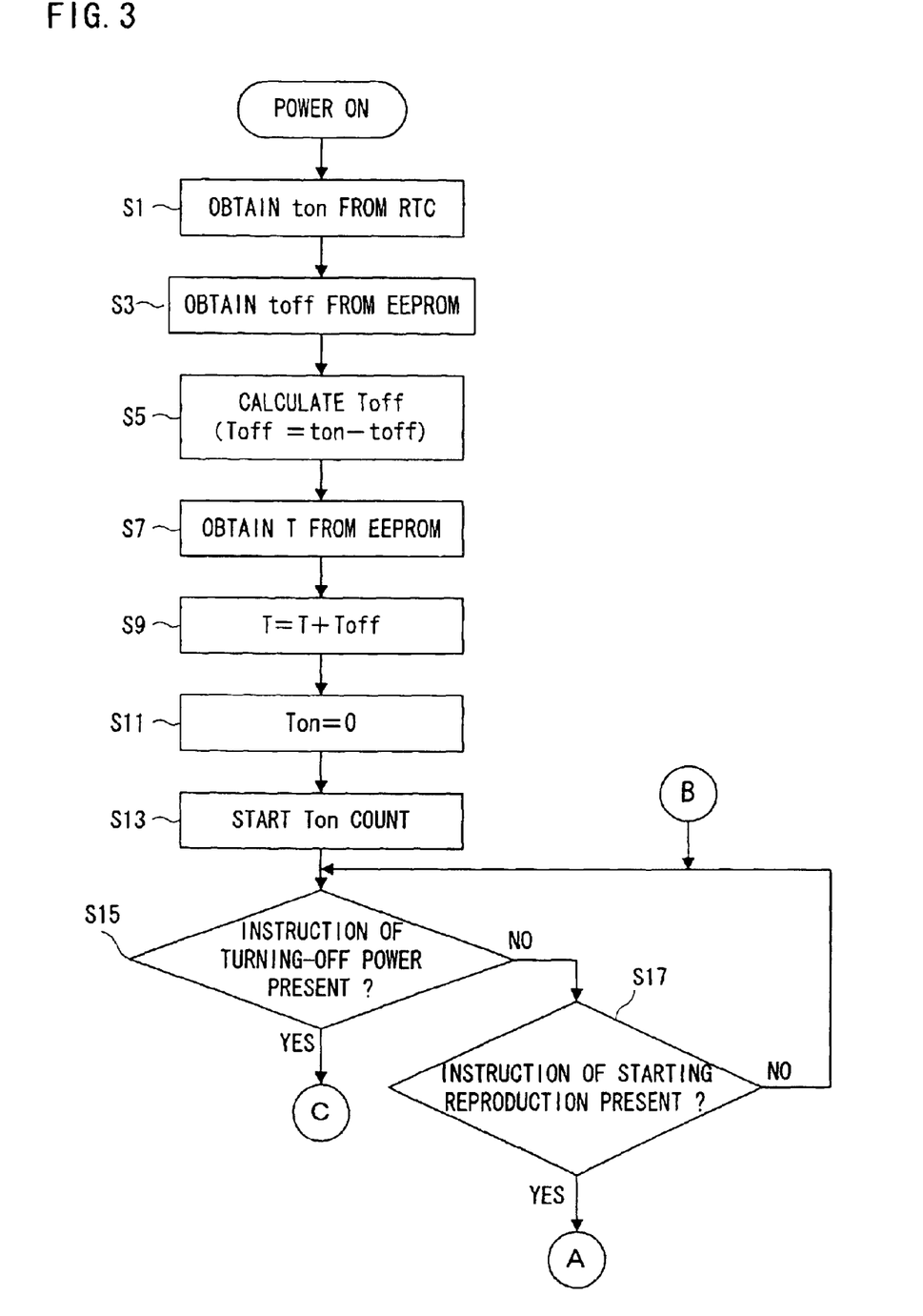
FIG. 3 is a flowchart showing an operation of a CPU in the FIG. 1 embodiment.
Figure 4:
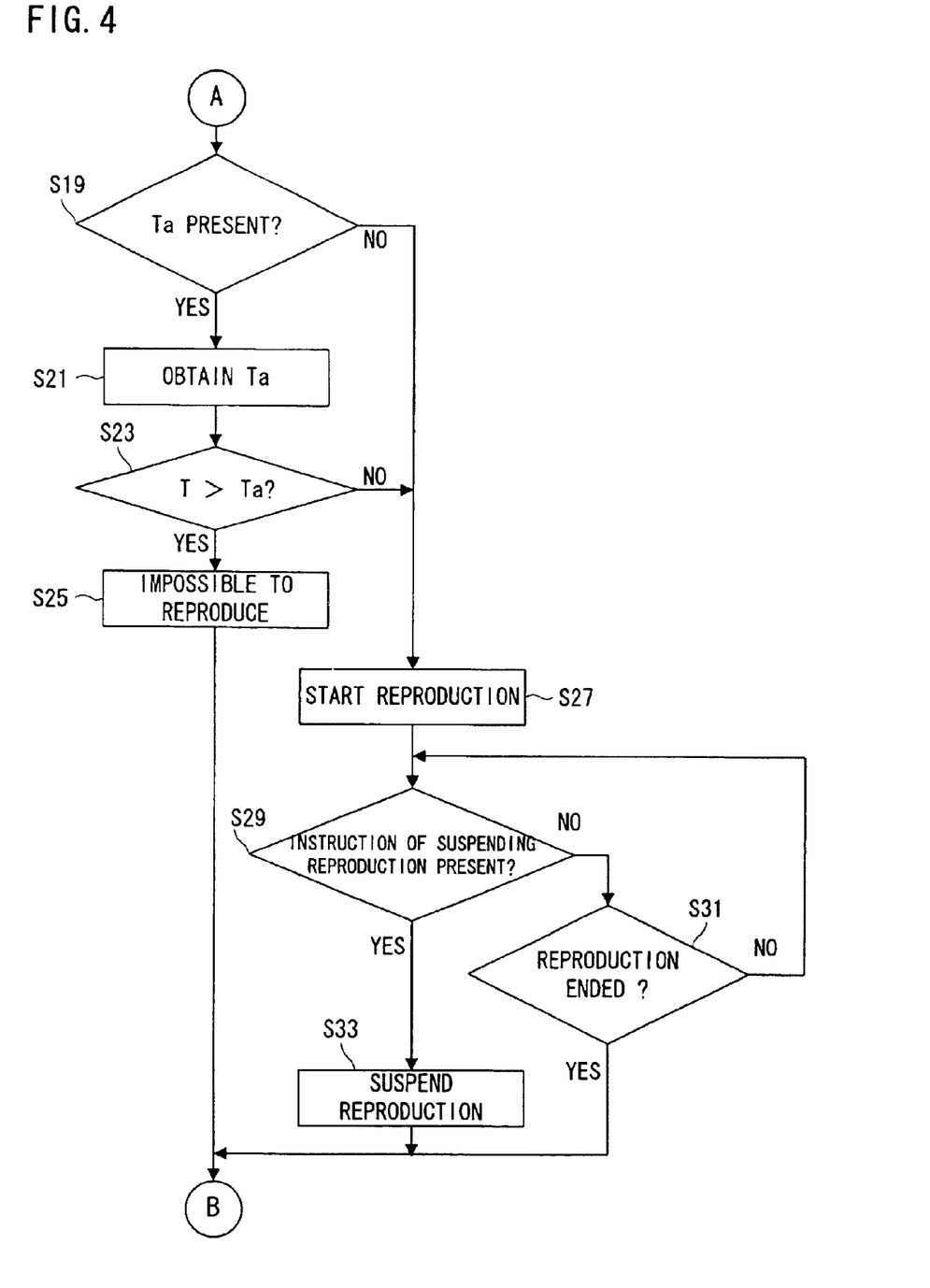
FIG. 4 is a flowchart showing an operation of the CPU subsequent to the flowchart of FIG. 3.
Figure 5:
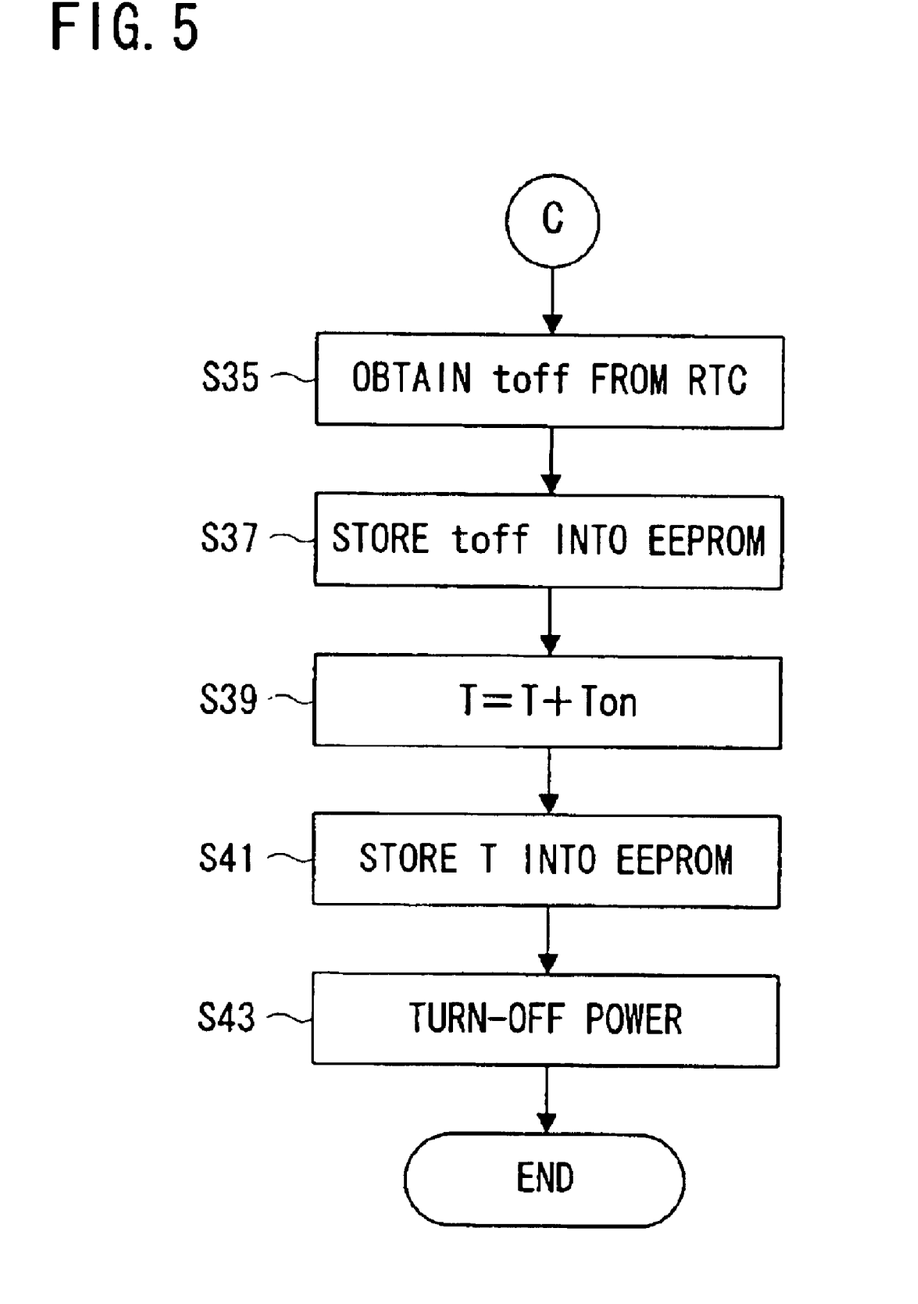
FIG. 5 is a flowchart, which is different from FIG. 4, showing an operation of the CPU subsequent to the flowchart of FIG. 3.

In order that the term of validity of the audio data is thus managed on the basis of the total sum T of the power-on time period Ton and the power-off time period Toff, the CPU 18 carries out processes in accordance with flowcharts of FIG. 3–FIG. 5. It is noted that a control program for controlling an operation of the CPU 18 according to these processes is stored in a memory not shown.

Referring to FIG. 3, when the main power switch 42 is turned-on, the CPU 18 obtains present time data with respect to a present time (a time that the main power switch 42 is turned-on) ton from the RTC circuit 32 in a step S1. Next, data regarding the time toff that the main power switch 42 is turned-off the last time is obtained from the EEPROM 36 in a step S3. It is noted that when the main power switch 42 is turned-on for a first time, data, that is, toff=0 is stored in the EEPROM 36 as data regarding the time toff.

After thus obtaining the data regarding each of the time ton and the time toff, the CPU 18 calculates a power-off time period Toff from a time difference of each of the time ton and the time toff (ton−toff) in a step S5. In addition, the data regarding the above-described total sum T is obtained from the EEPROM 36 in a step S7. It is noted that when the audio data having the term of validity is recorded into the memory card 12, data, e.g. T=0 is stored in the EEPROM 36 as data regarding the total sum T.

Then, a sum of the total sum T obtained in the step S7 and the power-off time period Toff calculated in the step S5 is evaluated in a step S9, and the evaluated sum is recognized as a new total sum T. Furthermore, after resetting (Ton=0) a counter for measuring the power-on time period Ton in the step S11, counting the power-on time period Ton is started in a step S13. It is noted that the counter mentioned here is completely different from the above-described RTC circuit 32, and may be structured in a software manner by the CPU 18 or by a hardware circuit.

Furthermore, the CPU 18 determines whether or not the above-described instruction of turning-off the power is applied from the operation key 20 in a step S15, and in a case that the instruction of turning-off the power is not applied, it is determined whether or not the instruction of starting reproducing is applied from the operation key 20 in a step S17. If the instruction of starting reproducing is applied in the step S17, the CPU 18 proceeds to a step S19 shown in a flowchart in FIG. 4.

In the step S19, the CPU 18 determines whether or not the audio data to be reproduced has the term of validity Ta. Then, in a case that the audio data to be reproduced has the term of validity Ta, data regarding the term of validity Ta is obtained from the memory card 12 in a step S21. Next, the above-described total sum T and the term of validity Ta are compared with each other in a step S23, and in a case that the total sum T exceeds the term of validity Ta, the process proceeds to a step S25 so as to render the audio data not reproducible. More specifically, a message indicating that the term of validity Ta is already elapsed is displayed on the display 34 without reproducing the audio data. Then, the CPU 18 returns to the step S15 in FIG. 3 after the process in the step S25.

On the other hand, in a case that the total sum T does not exceed the term of validity Ta in the step S23, the CPU 18 proceeds to a step S27 so as to start reproducing the audio data. Furthermore, it is determined whether or not the above-described instruction of suspending the reproduction is applied from the operation key 20 in a step S29, and in a case that the instruction of suspending the reproduction is not applied, it is determined whether or not the reproduction of the audio data is ended in a step S31. In the step S31, in a case that the reproduction of the audio data is not ended, the process returns to the step S29, and in a case that the reproduction is ended, the process returns to the step S15 in FIG. 3. It is noted that if the instruction of suspending the reproduction is applied from the operation key in the step S29, the CPU 18 proceeds to a step S33 so as to herein suspend the reproduction operation, and thereafter, the process returns to the step S15.

Upon receipt of the instruction of turning-off the power in the step S15, the CPU 18 proceeds to a step S35 shown in a flowchart in FIG. 5. Then, in the step S35, present time data regarding the present time (time that received the instruction of turning-off the power) toff from the RTC circuit 32 is obtained, and the data regarding the obtained time toff is stored into the EEPROM 36 in a step S37.

Furthermore, a sum of the above-described total sum T and the power-on time period Ton measured until a present time (until a point of time that the instruction of turning-off the power is received) is evaluated in a step S39, and the evaluated sum is recognized as a new total sum T. Moreover, after storing the data regarding the total sum T into the EEPROM 36 in a step S41, the process ends a series of the operations by actually turning-off the main power switch 42 in a step S43.

As described above, according to the content reproduction apparatus 10 of this first embodiment, the power-on time period Ton and the power-off time period Toff are sequentially measured, and then the term of validity Ta of the audio data is managed on the basis of the total sum T of each of the measured time periods Ton and the Toff. Therefore, different from the above-described prior art in which the term of validity Ta is managed on the basis of a date of a calendar that is arbitrarily set, it is possible to strictly manage the relevant term of validity Ta, and surely prevent an illegitimate use of the audio data having an elapsed term of validity Ta.

It is noted that with respect to the power-off time period Toff, which is calculated on the basis of the data regarding the time ton and toff obtained from the RTC circuit 32 so that it is seemingly considered that the power-off time period Toff is arbitrarily changeable by (illegitimately) operating the RTC circuit 32. However, since it is not possible to operate the RTC circuit 32 when the power is turned-off, an exact calculation is possible with respect to the power-off time period Toff even if a clock time by the RTC circuit 32 is not exact.

Figure 6:
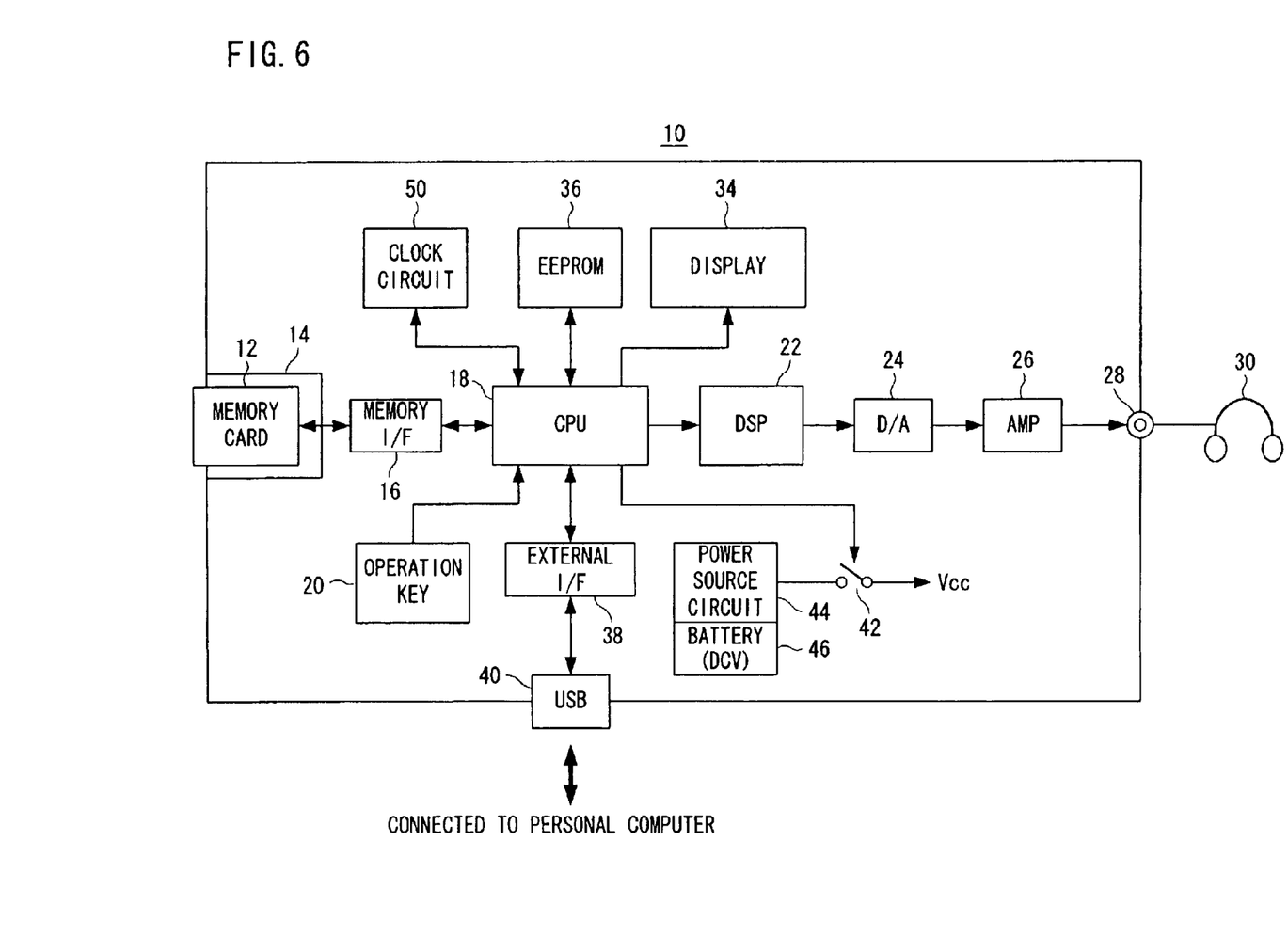
FIG. 6 is a block diagram showing schematic structure of a second embodiment of the present invention.

Next, referring to FIG. 6, the content reproduction apparatus 10 of the second embodiment is provided with a clock circuit 50 to be connected to the CPU 18 in place of the RTC circuit 32 and the back-up battery 48 in structure of the first embodiment shown in above-described FIG. 1. With respect to the structure other than this, the same is applied as in the first embodiment so that detailed descriptions are omitted by applying identical numerals to these similar portions as in FIG. 1.

In the second embodiment, the power-off time period Toff is measured by utilizing a discharge characteristic of a capacitor 52 described later that constitutes the clock circuit 50. In this point, the second embodiment is different from the first embodiment in that the power-off time period Toff is measured by utilizing the time ton and the toff measured by the RTC circuit 32.

Figure 7:
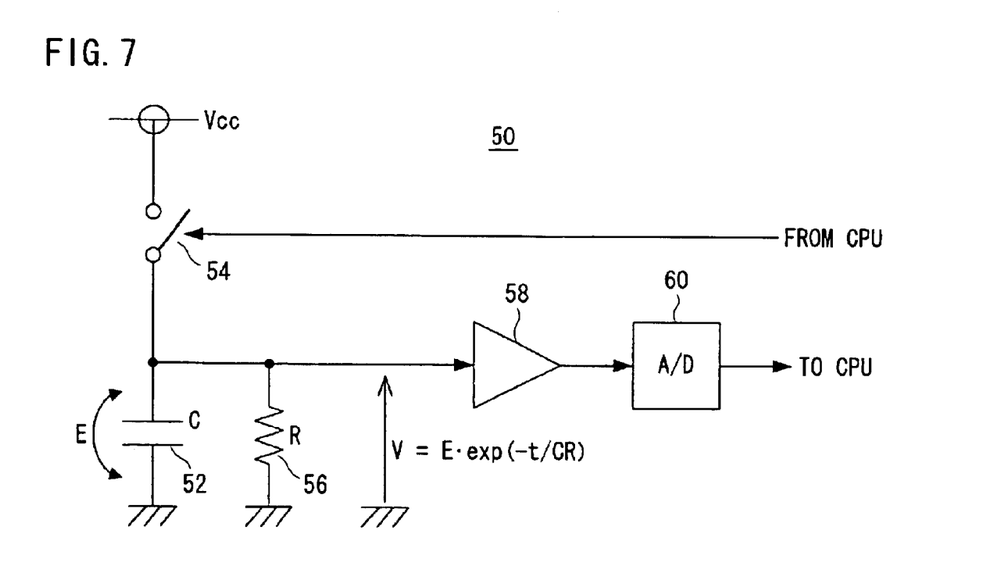
FIG. 7 is an illustrative view showing a clock circuit in detail in the FIG. 6 embodiment.

Referring to FIG. 7, the above-described capacitor 52 is connected in between the circuit voltage Vcc and a grounding electric potential (GND) via a switching circuit 54. An operation of turning-on/off the switching circuit 54 is controlled by the CPU 18. In addition, a resistor 56 is connected at both ends of the capacitor 52. Furthermore, a voltage V between the both ends of the resistor 56 (capacitor 52) is input into an A/D converter 60 via a buffer amplifier 58, and data digitalized by the A/D converter 60 is supplied to the CPU 18.

In structure of this FIG. 7, electric charges accumulated in the capacitor 52 are to be discharged by turning-off the switching circuit 54 after charging the capacitor 52 by turning-on the switching circuit 54, for example. In this case, the voltage V between the both ends of the resistor 56 is expressed by a following Equation (1).

$$V = E \cdot \exp(-t/CR)[V] \quad (1)$$

It is noted that E is voltage between the both ends of the capacitor 52 at a time of starting the discharge (t=0), and E≈Vcc. In addition, C is a capacity of the capacitor 52, and R is a resistance value of the resistor 56. Furthermore, an input impedance of the buffer amplifier 58 is infinite (∞).

Moreover, if Equation (1) is developed into an equation regarding a time t, a following Equation (2) is obtained.

$$t = CR(\log E - \log V)[s] \quad (2)$$

Herein, in view of a fact that each of the capacity C of the capacitor 52, the resistance value R of the resistor 56, and the voltage E (≈Vcc) between the both ends of the capacitor 52 at a start of discharging are known, it is possible to recognize the time period t from a time that the switching circuit 54 is turned-off by measuring the voltage V between the both ends of the capacitor 54. Therefore, as for an operation of the CPU 18, the switching circuit 54 is to be turned-off after temporarily turning-on the switching circuit 54 when the aforementioned instruction of turning-off the power is applied from the operation key 20 (at a point of time toff). Next, the voltage V is detected when the main power switch 42 is turned-on (at a point of time ton), thereby evaluating a discharging time period t by substituting Equation 2 for the detected voltage V, and consequently, the evaluated discharging time period t is specified as the power-off time period Toff.

This allows to calculate the power-off time period Toff by relatively simple circuit structure as shown in FIG. 7 not using the above-described RTC circuit 32. It is noted that a capacitor having a larger capacity C is preferably used as for the capacitor 52. Furthermore, a resistor value having a larger resistance value R is preferably used as for the resistor 56. It is noted that the discharging time period t may be evaluated under conditions of a natural discharge, not using the resistor 56.

It is noted that although in each of the above-described embodiments, descriptions are made regarding a case that the audio data is reproduced as a content, the present invention may be applied to an apparatus for reproducing other contents such as image data, for example. In addition, the content reproduction apparatus 10 is not necessarily a portable type, that is, a type fixed on a desk, a predetermined rack, or the like may be appropriate, for example.

Furthermore, although the memory card 12 is used as a means for recording audio data, this is not always limited thereto. Another recording medium such as a magnetooptical disk, a magnetic tape, or the like may be used, for example.

In addition, an error message is to be displayed on the display 36 in the step S57 in FIG. 5. However, the relevant error message may be output in an audible manner such as ringing a buzzer, outputting voices, and so on, for example, in place of (or, concurrently with) a visual manner, which displays the error message.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content reproduction apparatus for reproducing a content having a term of validity, comprising:

a first measuring means for measuring a first time period, which is from an on-operation of a main power until an off-operation thereof;

a second measuring means for measuring a second time period, which is from said off-operation until said on-operation of a next time;

a total sum calculation means for calculating a total sum of said first time period and said second time period; and an invalidating means for rendering invalid said content when said total sum exceeds a term of validity.

2. A content reproduction apparatus according to claim 1, further comprising a back-up power source, wherein said second measuring means includes a counting means that is driven by said back-up power source and counts a time period, and a calculating means for calculating said second time period on the basis of both a count value by said counting means when said off-operation is performed and a count value by said counting means when said on-operation of a next time is performed.

3. A content reproduction apparatus according to claim 1, wherein said second measuring means includes a capacitor in which electric charges are accumulated, a discharging means that causes said electric charges accumulated in said capacitor to be discharged in response to said off-operation, a detecting means that detects a terminal voltage of said capacitor in response to said on-operation, and a calculating means that calculates said second time period on the basis of said terminal voltage as detected.

* * * * *